July 18, 1967     H. C. QUARTIER     3,331,615

STEERING LINKAGE FOR TWIN AXLE VEHICLE

Filed Sept. 29, 1965

INVENTOR
HARRY C. QUARTIER, DECEASED

BY CLARA H. QUARTIER, ADMINISTRATRIX
BY *Walter S. Paul.*

ATTORNEY

United States Patent Office 3,331,615
Patented July 18, 1967

3,331,615
STEERING LINKAGE FOR TWIN AXLE VEHICLE
Harry C. Quartier, deceased, late of Kingman, Ariz., by Clara H. Quartier, administratrix, 522 Metcalfe Road, Kingman, Ariz. 86401
Filed Sept. 29, 1965, Ser. No. 491,861
2 Claims. (Cl. 280—96.2)

ABSTRACT OF THE DISCLOSURE

This invention comprises a change in the steering linkage of a conventional twin axle front wheel suspension having one steering link connected between the steering post arm at substantially one side of the vehicle and the steering arm of the wheel on the other side of the vehicle, and a second steering link connected between the steering arm of the wheel on the steering post side of the vehicle and a ball joint on the first steering link in proximity to the steering post arm, wherein the length of the latter steering link is extended and the ball joint is moved to the other end of said link substantially in line with the corresponding twin axle pivot.

---

The main object of this invention is to improve the handling characteristics of conventional steering linkages used on some standard motor vehicles, equipped with twin axle front wheel suspension.

A further object is to eliminate the tendency to wobble in the front wheels when travelling over rough roads.

A more specific object is to move the pivotal connection of the steering link extending from the left wheel steering arm to the steering rod or link which extends from the control arm on the steering post to the right wheel steering arm, from its intermediate position thereon to a position close to said right wheel steering arm, and lengthening said left wheel steering link accordingly so as to bring this pivotal connection into substantial axial alignment with the support pivot of the left wheel twin axle on the right side of the frame of the vehicle, thus eliminating the differential in the arcs described by the opposite ends of the left wheel steering arm as the wheel oscillates about said support pivot in going over bumps on the road.

A further object of the above modification is to simultaneously substantially eliminate any tow-in effect of the wheels due to the vertical motion of the steering post arm under the body frame, with respect to the wheels causing the wheel steering arms to spread apart each time the wheels are bumped upwardly to cause the left wheel steering link and steering rod extending to the right wheel, to approach horizontal alignment at their pivotal connection.

Figure 1:
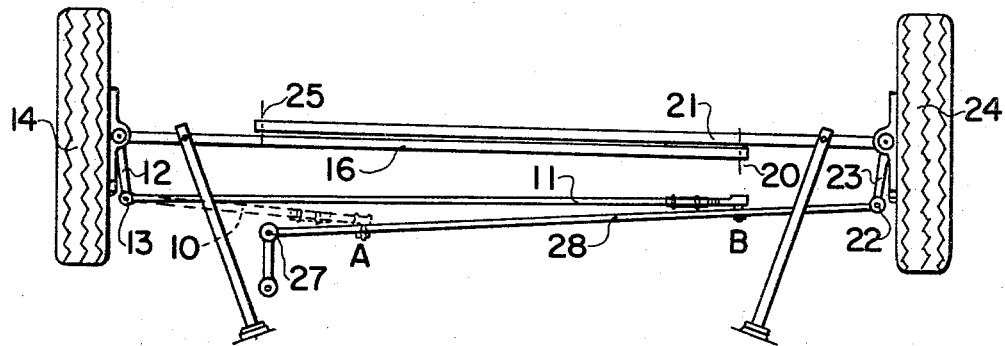
Figure 2:
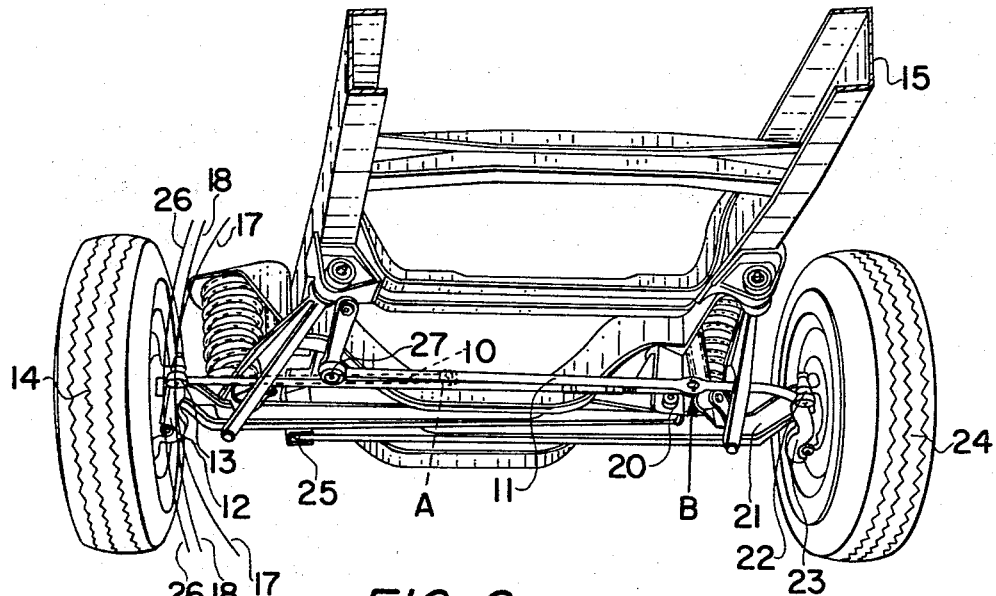

Other and more specific objects will become apparent in the following detail description of a preferred form of the present invention, as illustrated in the accompanying drawing, wherein:

FIG. 1 is a perspective rear view of the front wheel suspension and improved steering linkage, and FIG. 2 is a somewhat diagrammatic plan view of the twin-axle wheel suspension and improved steering linkage, illustrating in dotted lines where the left wheel steering link was attached in the prior art arrangement.

When a new model truck with twin axle front wheel suspension appeared on the market, it became very popular but some drivers found fault with its handling characteristics when travelling over bumpy roads. Upon examination of the front wheel suspension and the steering linkage it was discovered that the geometrics of the oscillation of the twin axles and the steering linkage was such that the left wheel would tow-in everytime it went over a bump. The steering link 10 (shown in dotted lines) connected to the steering arm 12 of the left wheel 14 being much shorter than the twin axle 16 of the left wheel, would move the steering arm connection 13 outwardly on an arc 17 about the pivot A as the steering link 10 approached the horizontal plane with each oscillation of the wheel 14 upwardly on a much flatter arc 18 about the pivotal connection 20 of its twin axle 16 to the right side of the body frame 15.

The radii of the corresponding arcs of the right steering arm connection 22 about the steering post connection 27 and wheel 24 about pivot 25 of twin axle 21, being of substantially equal lengths, did not cause the pronounced tow-in of the right wheel that the left wheel sustained with every bump, but whatever tow-in effects occurred as a result of either wheel oscillating upwardly were cumulative with respect to the effects of the oscillations of the other wheel.

It was found that these effects could be substantially eliminated by lengthening the steering link extending from connection 13 as indicated by the numeral 11 and connecting it to the right wheel steering link 28 at B near or at its connection 22 to the right wheel steering arm 23 substantially in axial alignment with the axle pivot 20. This substantially eliminated the cumulative effect as well as the deviation of the arcs at the left wheel which caused the tow-in when that wheel oscillated upwardly. Both arcs 26 and 18 at the left wheel were now substantially equally flat with minimum deviation in their direction and extent in substantially parallel planes of oscillation, causing the steering arm 12 to oscilate substantially without turning the wheel.

It is preferable to connect the steering links at B separately from the connection to the right wheel steering arm, and to make it a simple bolt connection to form a substantially horizontal pivot to permit vertical oscillation of both links as the automobile body moves up and down with respect to the wheels as they bounce over the bumps in the road.

In accordance with the present invention these vertical oscillations produce much less variations in the alignment of the wheels with respect to each other than they did in the original arrangement with a shorter linkage to the left wheel steering arm. In the original arrangement the short link oscillations would extend over greater angles as a result of its being pivoted to the other steering link at A, which was located much closer to the steering arm connection 13 than to the connection at the right wheel steering arm 22. In travelling over bumpy roads, as the horizontal pivot A between the links moved down to approach horizontal alignment of the links, their connections 13 and 22 to the opposite wheel steering arms 12 and 23 respectively would spread apart and cause the wheels to tow-in. The rebound upward movement of the pivot A would cause the wheels to tow-out, if they were normally adjusted in parallel alignment. These variations in the wheel alignment are substantially eliminated in the present invention because the pivot B between the link has been moved into substantial alignment with the pivot 20 of the twin axle 16 about which the left wheel 14 oscillates when travelling over bumps. This pivot being close to axial alignment with the right wheel steering arm connection 13, the vertical movement of the pivot B between the links 11 and 28 is reduced to a negligible amount and so is the angle of oscillation of the left wheel steering link, so that the variations in wheel alignment is essentially eliminated, resulting in no tendency for either wheel to wobble.

While this novel linkage arrangement is specially adapted for use with the twin axle front wheel suspension with the wheel axle pivots located on the opposite sides of the body frame in proximate axial alignment with the connections 27 and B of the steering links; a similar arrangement of link pivots may be adapted for use with front wheel suspensions having other axle pivot locations on the body frame. The principal distinction in these arrangements being that link pivots be provided in the steering link between wheels at points substantially in axial alignment with the corresponding axle pivots, so that the arcs described by the wheels during their oscillations about their axle pivots will substantially coincide with the arcs described by them about the corresponding link pivots, thus preventing any resultant spreading of drawing together of the wheel steering arm connections while the wheels bounce over a bumpy road.

What is claimed is:

1. A steering linkage for an automobile having resilient front wheel suspension on pivoted axles pivoted to opposite sides of the automobile frame on pivots extending axially of said frame a steering arm extending back from the king pin bearing on each front wheel and a steering post arm extending forwardly from the lower end of its post under the body frame at one side of the automobile substantially in line with the one side of the automobile frame, comprising a first steering link connected between the steering post arm and the other wheel steering arm, and
   a second steering link connected between the wheel steering arm on said one side and said first steering link close to its connection to said other wheel steering arm, in substantial axial alignment with said other side wheel axle pivot.

2. A steering linkage for an automobile having resilient front wheel suspension on independent axles pivoted to opposite sides of the automobile frame on pivots extending axially of said frame, each wheel having a steering arm extending back from its king pin bearing, and a steering post arm extending forwardly from the steering post under one side of the automobile frame substantially in line with said side of the frame, comprising a steering rod extending transversely under said frame between said steering arm post and the other side wheel steering arm, and
   a steering link extending from said one side wheel steering arm to a pivotal joint on said steering rod close to its juncture with said other side wheel steering arm, substantially in axial alignment with the wheel axle pivot on the other side of the frame, whereby the arcs described by both ends of said one side wheel steering arm about their respective pivots during oscillations of the axle and the steering link as the wheel bounces over a rough road will substantially coincide and will cause no tendency of the wheels to wobble even on extremely rough roads.

References Cited
UNITED STATES PATENTS

| | | | |
|---|---|---|---|
| 2,039,671 | 5/1936 | Wagner | 267—20 |
| 2,096,542 | 10/1937 | Haltenberger | 280—95 |
| 2,175,429 | 10/1939 | Chayne | 280—95 |
| 3,105,699 | 10/1963 | Peras | 280—96.2 |

KENNETH H. BETTS, *Primary Examiner.*